US006106742A

United States Patent [19]

Argyropoulos et al.

[11] Patent Number: 6,106,742

[45] Date of Patent: Aug. 22, 2000

[54] HIGH SOLIDS CONDUCTIVE COATINGS COMPOSITIONS SUITABLE FOR ELECTROSTATIC ATOMIZATION APPLICATION METHODS

[75] Inventors: John Nicholas Argyropoulos, Scott Depot; Richard Hill Bailey; Kenneth Look Hoy, both of St. Albins, all of W. Va.; Gerald Robert Gilliam, Henderson, Ky.; Kevin Joseph Riggs, Evansville, Ind.

[73] Assignee: Union Carbide Chemicals & Plastics Technology Corporation, Danbury, Conn.

[21] Appl. No.: 09/288,727

[22] Filed: Apr. 9, 1999

Related U.S. Application Data

[60] Provisional application No. 60/084,926, May 11, 1998, and provisional application No. 60/100,175, Sep. 14, 1998.

[51] Int. Cl.[7] .................................................. H01B 1/06

[52] U.S. Cl. ......................... 252/511; 252/512; 252/513; 252/514; 252/519.3; 427/421; 427/422; 524/524; 524/427; 524/515

[58] Field of Search ........................ 252/511–514, 519.3; 524/524, 515, 525, 527; 427/421, 422, 426

[56] References Cited

U.S. PATENT DOCUMENTS

| | | | |
|---|---|---|---|
| 4,923,720 | 5/1990 | Lee et al. | 427/422 |
| 4,981,730 | 1/1991 | Zaleski et al. | 427/393.5 |
| 5,009,367 | 4/1991 | Nielsen | 239/3 |
| 5,057,342 | 10/1991 | Hoy et al. | 427/422 |
| 5,106,650 | 4/1992 | Hoy et al. | 427/27 |
| 5,108,799 | 4/1992 | Hoy et al. | 427/422 |
| 5,171,613 | 12/1992 | Bok et al. | 427/422 |
| 5,425,969 | 6/1995 | Wakabayashi et al. | 427/470 |

FOREIGN PATENT DOCUMENTS

| | | | |
|---|---|---|---|
| 0628971 A1 | 12/1992 | European Pat. Off. | H01B 1/24 |
| 0300453A2 | 1/1995 | European Pat. Off. | C09D 5/24 |
| WO 9508829 | 3/1995 | WIPO | H01B 1/22 |

OTHER PUBLICATIONS

Mechanical Properties of Polymers and Composites, L.E. Nielsen, vol. 2, p. 383, Marcel Dekker Inc., NY (1974).

Progress in Organic Coatings, Design Considerations for High Solids Coatings, L.W. Hill & Z.W. Wicks, Jr., vol. 10, pp 55 and 69–76 (1982).

Advanced Coatings Technology, Conductive Carbon Black Dispersions for Automotive Primers, Proceedings of the EDS/ASM, Advanced Coatings Technology Conference, Jun. 10–12, 1991, K.A. Porter, pp 9–17.

Encyclopedia of Chemical Technology, vol. 4, pp 1063–1074, Kirk Othmer, 4th Ed., John Wiley & Sons, NY (1992).

Industrial Solvents Handbook, W.L. Archer, p. 37, Marcel Dekker Inc., NY (1996).

Phys. Rev., I, Langmir, vol. 2, p 329 (1913).

Ann. Physik, M. Knudsen, vol. 47, p 697 (1915).

Ind. Eng. Chem., W.K. Asbeck & M. Van Loo, vol. 41, pp 1470–1475 (1949).

J. Phys, Chem., B. Gross & R.M. Fuoss, vol. 60, pp 474–480 (1956).

*Primary Examiner*—Yogendra Gupta
*Assistant Examiner*—Derrick G. Hamlin
*Attorney, Agent, or Firm*—G. T. Hampilos; G. P. Rooney

[57] ABSTRACT

This invention pertains to novel higher solids conductive coating compositions which can be applied by spray and other atomization methods. More particularly, it pertains to novel higher solids conductive coating compositions capable of application by electrostatic atomization methods. While there are many applications in which conductive coatings are useful, the invention is particularly useful for the manufacture of adhesion promoting primer compositions which have higher solids and can be applied by electrostatic atomization methods. The key components of the present invention are:

(i) a conductive pigment, (ii) a non-conductive polymeric binder, and (iii) a solvent selected for its ability:

(a) to form a stable non-conductive dispersion of a conductive pigment when subjected to an electrostatic potential of 20000+ volts, (b) to provide for a higher solids liquid coatings composition thereby reducing the volatile organic emissions (VOC) during application.

(c) to promote the coalescence and formation of a uniform conductive film.

24 Claims, No Drawings

HIGH SOLIDS CONDUCTIVE COATINGS COMPOSITIONS SUITABLE FOR ELECTROSTATIC ATOMIZATION APPLICATION METHODS

This application claims benefit of provisional applications No. 60/084,926, filed May 11, 1998, and 60/100,175, filed Sep. 14, 1998.

FIELD OF THE INVENTION

A conductive coating is liquid material, which is capable of forming, on either a non-conductive or a conductive substrate, a uniform film which can conduct an electric current. A common method of formulating a conductive coating is to incorporate a conductive pigment into a non-conductive film forming binder at such a concentration that when the film has formed the pigment particles are in contact with each other and form a conductive pathway for an electric current.

This invention pertains to novel higher solids conductive coating compositions which can be applied by spray and other atomization methods. More particularly it pertains to novel higher solids conductive coating compositions capable of application by electrostatic atomization methods. While there are many applications in which conductive coatings are useful, the invention is particularly useful for the manufacture of adhesion promoting primer compositions which have higher solids and can be applied by electrostatic atomization methods. The key components of the present invention are:

(i) a conductive pigment, (ii) a non-conductive polymeric binder, and (iii) a solvent selected for its ability:

(a) to form a stable non-conductive dispersion of a conductive pigment when subjected to an electrostatic potential of 20000+ volts, (b) to provide for a higher solids liquid coatings composition thereby reducing the volatile organic emissions (VOC) during application.

(c) to promote the coalescence and formation of a uniform conductive film.

Other minor ingredients may be incorporated by those skilled in the art to increase the utility and value of the applied coating, e.g. bubble release, flow and leveling agents, flatting agents, water scavengers, color contrasting pigments, and the like, however they are not the essential teaching of the present patent but are well recognized by those skilled in the art and may be inferred as incorporated in the present disclosure.

BACKGROUND OF THE INVENTION

Recent government regulatory policies requiring a reduction of volatile organic emissions (VOC) in coating processes has focused attention on:

(i) the transfer efficiency of the application process, i. e. the percent of coating applied to a target substrate based on the amount used in the process, and (ii) the use of coating compositions which contain less volatile solvents.

Electrostatic atomization application methods can improve the transfer efficiency of coatings processes from 30–40% for conventional air spray to 70–95% for a well managed electrostatic process. The concurrent use of high solids coating compositions can further eliminate up to 60%–90% of the VOC emissions from a conventional coating process.

Conductive coatings are prepared by the incorporation of conductive pigments and/or fillers to a non-conductive binder. The concentration of the conductive pigments or fillers is such that in the final film each conductive pigment or filler particle is in contact or near contact with each of the surrounding conductive pigment particles in the film. The required conductive property of these coatings requires the volume concentration of the conductive pigments or fillers to be near, at or just above the critical pigment volume concentration (CPVC).

The electrostatic application of a paint requires that the liquid material be highly resistive or nearly non-conductive. Since resistivity is the reciprocal of conductivity, it is apparent that the paint must have a stable high resistivity while in the liquid form but after application and film formation have a low resistivity or be conductive. In conventional lower solids (7–20%) conductive coatings compositions, it is possible to formulate liquid compositions which will form conductive dry films, and yet have high resistivities in the liquid form. The extra solvent used in the formulation has two functions:

(i) to reduce the consistency of the liquid paint to a viscosity that can be readily atomized, and (ii) to act as an insulating medium which prevents close contact of the conducting pigments and/or fillers.

The current regulatory policy of emission reduction with respect to volatile organic compounds (VOC) has outdated the conventional lower solids technology for the manufacture of these types of conductive coatings. Removal of the extra solvent in the conventional formulation not only causes an unacceptable increase in viscosity but forces the conductive pigments and/or fillers into close proximity within the liquid material, and as a result these liquid coating formulations have been shown to short out the charging circuits of electrostatic application devices. It is theorized that resistive failure in these formulations may be caused by two phenomena:

(i) the conductive pigment tends to orient upon the application of an electrostatic field and form a conductive pathway within the liquid paint, in a sense a "live wire or shunt" is formed, and (ii) the conductive pigment is not uniformly dispersed and as such there are present agglomerates of the conductive pigment which degrades the packing character of the conductive pigment in the liquid medium.

It may be that both mechanisms of failure are operable, but regardless of the cause of the problem, compositions of the present invention have been shown to solve the confounding requirements of:

(i) a conductive coating, (ii) higher solids for VOC reduction, and (iii) a paint capable of application by electrostatic atomization methods for higher transfer efficiency.

DETAILS OF THE INVENTION

There are many applications for polymer compositions and conductive coatings. The following are but a few of the notable applications: anti-static coatings for carpet backings and floor mats, video tape and disks, electrical heating elements, high voltage conductive shields, etc.

Inherent to the practice of this invention is the understanding that end use demands of a coating are often multiple and that conductivity is but one of the requirements of a successful conductive coating.

For example illustrative of the multiple requirements of a coating is a conductive primer. A conductive primer must have excellent adhesion to the intended substrate as well as promote excellent adhesion to any subsequent coatings that may be applied. While it is the conductive pigment which provides conduction in the final film, it is the non-conductive binder that in this case provides the adhesive property.

Another example illustrative of this multiplicity of coating requirements might be a conductive coating designed to act as a defrosting resistance heater on automotive glass or non-fogging mirrors. Such coatings would be expected to have good adhesion, excellent heat and thermal properties as well as having excellent weathering properties. These other required properties are more likely related to the properties of the non-conductive binder and not necessarily to the conductive properties of the coating. Key to the practice of this invention is the choice of:

(i) a non-conducting polymeric binder having additional properties which satisfy the requirements of the intended end use, and (ii) a conductive pigment or filler, and (iii) solvents selected on the basis of:

(a) their evaporation rate, (b) their ability to wet and disperse the conductive pigment, and (c) their ability to solvate and dissolve the non-conducting polymer.

Other additives known to the art, e.g. color contrasting pigments, flow control agents, flattening agents, and other modifiers are often incorporated into conductive coatings compositions; they do enhance the utility of the coating composition, however they are not the essential teaching of the present disclosure and may be implied as incorporated in the present patent.

The Non-Conducting Polymeric Binder

The non-conducting polymer of choice for any particular application is determined by not only the resistivity of the polymer but other properties which give the coating other required properties demanded by the application.

For example, often in the design and manufacture of an article requires that two different kinds of material be joined and finished in the same operation. Such is the case in the manufacture of automobiles where metallic assemblies are frequently joined to plastic moldings. Frequently adhesion of the finishing system to the metallic substrate is excellent but only marginal on the non-polar plastic substrate. Adhesion promoting primers are used to render certain plastic substrates more receptive to the final finishing system. When used to make higher solids conductive adhesion promoting primer compositions, the non-conductive polymers should adhere well to the substrate and form a new surface to which the subsequent application of a different coating will adhere. The polymeric component in addition to being non-conductive in character serves as a transition-coating to insure the adhesion of a subsequent coating, e.g. a color base coat to an untreated plastic substrate. Such substrate might be any of a class of molding polymers known generically as thermoplastic olefin (TPO). TPO polymers are used to fabricate automotive parts such as fascia, bumpers, covers and the like.

Some non-conductive polymers of particular interest for use in higher solids adhesion promoting primers on TPO are thermoplastic polyolefinic or chlorinated polyolefinic polymers (CPO), chlorinated maleic anhydride-propylene copolymers, silylated CPO block copolymers, maleic acid or anhydride grafted styrene-butadiene copolymers, and the like.

Examples of suitable non-conductive binders for other applications are organic polymers such as polymers of vinyl esters, vinyl chloride and copolymers thereof, acrylic esters and copolymers there of, styrene and styrene copolymers, butadiene, isoprene, and other olefinic polymers such as polymers from propylene and its copolymers with ethylene, and other alpha olefins. Almost any non-conductive organic polymer can be used, either a thermoplastic or a polymer which can be crosslinked after application, provided in addition to its non-conductive properties, the final polymer satisfies the other physical properties of the end use application.

The Conducting Pigments and Fillers

Examples of conducting pigments or fillers are any of the various carbon blacks, powdered graphite, powdered or flake metals such as zinc, iron, copper, brass, bronze, stainless steel, nickel, silver, gold, aluminum and the like. Again the conductive pigment is chosen to meet the specific end-use criteria. For example the physical properties of conductive carbon pigments suitable for the manufacture of high solids conductive adhesion promoting primers are summarized in Table I (Encyclopedia of Chemical Technology, Vol. 4, 1068, Kirkothomer 4th Ed., John Wiley & Sons, N.Y., 1992).

The dibutylphthalate absorption value (DBPA) is a measure of the apparent critical packing of that particular grade of conductive carbon black. By assuming the specific gravity of conductive carbon black ranges from 1.8 to 2.1 or an average of 1.95 and based on the specific gravity of dibutyl phthalate is 1.0480@25° C., an estimate of the CPVC of the conductive carbon black can be made. The number in parenthesis adjacent to DBPA in the table is the estimated apparent CPVC of the various grades of conductive carbon black pigments.

The adsorption surface area in terms of $N_2$ compared to the cetyltrimethylammonium bromide (CTAB) surface area is a measure of the apparent porosity of the conductive pigment. The CTAB molecule is much larger than $N_2$ and can not enter the small pores of the conductive pigment.

TABLE I

Typical Data and Uses for Electrically Conductive Grades of Carbon Black

| Type | Particle diameter (nm) | $N_2$ Surface area ($m^2/g$) | CTAB Surface area ($m^2/g$) | DBPA[a] (mL/100 g) CPVC % | Tinting Strength, D3265 | Uses |
|---|---|---|---|---|---|---|
| acetylene black | 42 | 64 | — | 300 (15.2) | 52 | High voltage semiconductive shields, conductive rubber, and plastics |
| conductive furnace (CF) N293 | 22 | 145 | 114 | 100 (35.0) | 117 | Conductive rubber and plastics, carpet backing |
| conductive furnace | 22 | 270 | 145 | 100 | 82 | Conductive and antistatic |

TABLE I-continued

Typical Data and Uses for Electrically Conductive Grades of Carbon Black

| Type | Particle diameter (nm) | $N_2$ Surface area ($m^2/g$) | CTAB Surface area ($m^2/g$) | DBPA[a] (mL/100 g) CPVC % | Tinting Strength, D3265 | Uses |
|---|---|---|---|---|---|---|
| (CF) N742 | | | | (23.2) | | rubber and plastic products. |
| super conductive furnace (SCF) | — | 1475 | 620 | 330 | 163 | Electromagnetic interference shielding (EMI) compounds, video disks, tapes, etc. |
| | | | | (14.0) | | |
| | | 1000 | | 245 | | |
| | | | | (18.0) | | |
| syn gas byproduct carbon | 30 | 800 | 620 | 365 | 124 | EMI, video disks, PTC[b] compounds (for heating tapes). |
| | | | | (12.8) | | |
| | | 1000 | | 400 | | |
| | | | | (11.8) | | |
| | | 1250 | | 495 | | |
| | | | | (9.8) | | |

([a]) Dibutyl Phthalate Adsorption
([b]) PTC = Positive Temperature Coefficient solubility parameter for the solvent. Polymer solubility in the solvent is a reasonable possibility if the radius of interaction, $R_A$, is less than 10 or less than the radius of the resin solubility sphere. For example, the radius of interaction for chloropolypropylene (CPO resin) and xylene (a typical aromatic hydrocarbon solvent) has a calculated value of 5.4. Hence aromatic hydrocarbon solvents are excellent solvents for CPO resins used in adhesion promoting primers.

(2) Evaporation Rate

In conventional lower solids coatings, a major portion of the solvents in the paint are lower boiling solvents. These highly volatile solvents are necessary to reduce the viscosity of the paint so that it can be atomized or sprayed. During the atomization process and travel to the substrate nearly all of the lower boiling solvents are lost from the paint leaving only higher boiling solvents to aid in film formation. These lower boiling, highly evaporative solvents account for 60–80% of the volatile emissions (VOC) in the conventional conductive coating. The remainder (20–40%) of the solvents are higher boiling solvents which remain in the paint, and are necessary for the coalescence and flow of the paint on the substrate as it forms a uniform film. Ideally in high solids coatings, the slower evaporating higher boiling solvents should be chosen based on their ability to lower the viscosity of the coating. The preferred slow evaporating solvents of this invention are especially effective in lowering the viscosity of the coating on the substrate which should enhance flow of the paint for improved coalescence and film formation.

In higher solids coatings the advent of other atomization techniques, e.g. hot spray, supercritical gaseous spray, rotary bells and discs, high pressure low volume (HPLV) and even high pressure airless spray have eliminated the need for the lower boiling, highly evaporative solvents. Thus only the higher boiling lower evaporative

Solvents for the Formulation of High Solids Conductive Coatings

The solvents useful in the practice of the present invention are selected as indicated previously by (1) solvency towards the non-conductive binder (2) their evaporation rate, and (3) their wetting and dispersive character with respect to the conductive pigments and fillers.

(1) Solvency Towards the Non-Conductive Binder

The first requirement of the solvents or mixture of solvents suitable for the compositions of the present invention is their ability to solvate and dissolve the non-conductive polymer. The choice of solvent or mixture of solvents is aided by considering the total solubility parameters of the solvents or mixture of solvents with respect to the corresponding total solubility parameters of the non-conductive polymer. An even more discriminating criteria is based on a separation of the total solubility parameter into three energy components representing non-polar (London forces), polar (dipole-dipole forces) and hydrogen bonding forces inherent in the solvent and polymer molecules. The measurement of the degree of solubility parameter match between solvent and polymer is provided by the radius of interaction, $R_A$, as shown by equation 1 (Archer W. L., Industrial Solvents Handbook, 37, Marcel Dekker Inc., N.Y., 1996).

$$R_A = \sqrt{(\delta^p_{np} - \delta^s_{np})^2 + (\delta^p_p - \delta^s_p)^2 + (\delta^p_h - \delta^s_h)^2} \quad (1)$$

In equation 1, $\delta_{np}^P$ is the non-polar solubility parameter for the polymer, $\delta_{np}^2$ is the non-polar solubility parameter for the solvent, $\delta_p^P$ is the polar solubility parameter for the polymer, $\delta_p^2$ is the polar solubility parameter for the solvent, $\delta_h^P$ is the hydrogen bonding solubility parameter for the polymer, and $\delta_h^s$ is the hydrogen bonding solvents are preferred in higher solids coating compositions. In this manner the environmental policy of reduced VOC emission can be complied with.

The common means of classifying evaporation rate of a solvent is by its relative evaporation rate (RER). The RER is the rate of evaporation of a solvent compared to the rate of evaporation of a standard solvent. The RER of a solvent can be estimated from a relationship derived from kinetic theory (Langmir, I., Phys. Rev., 2, 329, 1913; Knudsen, M., Ann. Physik, 47, 697, 1915). The steady state rate of evaporation of a liquid into a vacuum in terms of volume/unit area/unit time $$\left(\frac{\partial V_L}{\partial t}\right)$$

is given in equation (2).

$$\left[\frac{\partial V_L}{\partial t}\right]_{p.T.} = \alpha p\left[\frac{Mw}{2\pi RT}\right]^{\frac{1}{2}} \quad (2)$$

From equation (2) the relationship relating RER to vapor pressure of the solvent (p) and solvent molecular weight (Mw) is derived, where R is the gas constant and T is temperature in degrees Kelvin. If the rate of evaporation of a solvent is compared to the evaporation of a standard solvent (butyl acetate with an RER set at 100), and if it is assumed that the reflux coefficients ($\alpha$) of all solvents are nearly equal, then equation (2) reduces to equation (3). RER's of solvents are commonly reported in the literature based on a relative evaporation rate to a butyl acetate standard equal to 100 using ASTM D3599 at 25° C. and at one atmosphere pressure.

$$RER = 0.8217p\sqrt{Mw} \tag{3}$$

The RER criteria of evaporation for solvents suitable for the compositions of the present invention have RER's in the range of 0.50 to 95, more preferred are solvents having an RER in the range of 1 to 85, most preferred are solvents having an RER in the range of 4 to 75. Those skilled in the art will recognize that in order to meet all of the film forming requirements mixtures or blends of solvents having the above properties are incorporated in the teaching of the present invention.

(3) Wetting and Dispersing the Conductive Pigment

Because the present invention solves the problem of how to make a liquid paint with high resistivity for electrostatic application and yet when the same paint upon electrostatic application will form a dry conductive uniform film, the manner in which the conductive pigment or fillers are wetted and dispersed in the paint has serious consequences on the resistivity of the paint as well as the conductivity of the final film. Because the teaching of the present invention deals with how conductive pigment particles are contained in the liquid paint and in the conductive film, it is more convenient to envision volume relationships rather than weight. In a given volume of paint the ratio of the volume of particles of pigment to the total volume of the liquid paint is known as the particle volume concentration, $\phi$, equation 4.

$$\phi = \frac{Volume_{pigment}}{Volume_{paint}} \tag{4}$$

The free volume of a dispersion is considered to be the volume available for the particles to move about without colliding with each other. The free volume of the liquid paint is related to the particle volume concentration by equation 5. The term $K_c$ is the critical packing constant of the system.

$$V_{free\ volume} = 1 - \frac{\phi}{K_c} \tag{5}$$

Let us envision a suspension of a particulate material dispersed in a fixed volume of fluid, and let us increase the number of particles until each particles is in contact with each of its nearest neighbors. Although there is enough fluid to wet and fill the space between all the particles (voids), movement of particles is impossible. The system is said to have reached critical packing, and the free volume of the system is now zero, i.e. the particles are so crowded into the fixed element of volume that they are not free to move. When each particle is in contact with its nearest neighbors, the ratio of the volume of particles to the total volume, i.e. sum of the volume of particles+the volume between the particles (void volume) is the critical packing constant for the pigment in that vehicle. From equation 5 it is apparent that when $\phi$ is equal to $K_c$ the free volume is zero.

$$K_c = \frac{V_{particles}}{V_{particles} + Void\ Volume} \tag{6}$$

The viscosity of the paint is related to the free volume of the dispersion by the Mooney equation. The term $\eta_{vehicle}$ is the viscosity of the unpigmented liquid binder and $K_e$ is known as the Einstein Coefficient and is indicative of the shape of the particles. If the shape of the particles approximate a sphere then $K_e$=2.5. Both $K_c$ and $\phi$ are properties of the liquid paint.

$$\eta_{paint} = \eta_{vehicle} \exp\left[\frac{K_e\phi}{1 - \phi / K_e}\right] \tag{7}$$

The second volume relationship key to the practice of the present invention is related to the arrangement of the conductive pigment particles in the dry film. Conceptually, these volume relationships are very similar to the volume relationship of the liquid paint except they relate to the arrangement of pigment particles in the dry paint film instead of the liquid paint. The properties of a pigmented coating film are directly related to the volume occupied by the pigments and fillers within the volume of the film. This basic concept of pigment volume concentration (PVC) in the dry paint film was introduced to the coatings industry by Asbeck (Asbeck, W. K. and Van Loo, M., Ind. Eng. Chem., 41, 1470, 1949). They were able to identify a unique PVC at which nearly all of the coating properties undergo a dramatic transition. This unique volume concentration of particulate material was termed the critical pigment volume concentration (CPVC).

Their relationship is valid for film conductivity as well. The main variable determining film conductivity is the volume concentration of the conductive pigment (Gross, B. and Fuoss, R. M., J. Phys. Chem., 60, 474, 1956). For superconductive carbon black the critical concentration is 7–8% by weight and for thermal blacks as high as 65–70% by weight. It can be seen there is a critical concentration for each grade of conductive carbon black above which conductivity rapidly increases and resistivity drops precipitously.

In order to attain reasonable conductivity in a conductive dry paint film each conductive primary pigment particle must be in contact or very near proximity with each of its nearest neighbors, i.e. the free volume of the pigments with respect to the dry film approaches or is zero. This requirement fixes the composition of the dry paint film to be near, at or slightly above the CPVC of the conductive pigment.

As mentioned earlier the viscosity of the liquid paint can be modeled by the Mooney equation. Since the amount of conductive pigment is regulated by the CPVC of the pigment system in the dry paint film, and since coupled with the need to reduce the VOC of the coating in order to comply with governmental regulations, the amount of solvent that can be included in the coating composition fixes the particle volume, $\phi$. Because of these end use requirements, both the particle volume concentration, $\phi$, and the Critical Pigment Concentration, CPVC, must remain more or less constant. Hence the only means of increasing the free volume of the liquid paint is to increase the critical packing constant, $K_c$, of the conductive pigments in the liquid paint. From the data presented in Table I, i.e. the $N_2$ surface area vs. the CTAB surface area it is apparent that the conductive carbon pigment appear to be quite porous. However, from electron micrographs, there is reason to believe the apparent porosity in large measure is the result of aggregation of the primary particles of carbon. It is known that pigment agglomeration causes dispersion viscosity to be grossly exaggerated when compared to the same pigment well dispersed in the liquid medium (Nielsen, L. E., Mechanical Properties of Polymers and Composites, Vol. 2, 383, Marcel Dekker Inc., N.Y., 1974).

It has been found that when certain classes of solvents are used to replace the certain other commonly used solvents of commerce, the viscosity of high solids liquid conductive paint formulations are dramatically reduced and at the same time these lower viscosity paint formulations have stable resistivities. It is believed that the solvents of the present invention cause a deagglomeration of the conductive pigments resulting in an increase in the value of $K_c$. An increase in the value of $K_c$ would be expected to increase the liquid free volume of the system and hence increase the resistivity of the liquid paint. Concurrently it would be expected that an added benefit would be the lowering of the viscosity of the liquid conductive paint.

One of the essential teachings of this patent is a formulation strategy which minimizes particle-particle interaction (deagglomeration) of the conductive pigments in the liquid paint while at the same time promoting conductive particle-particle contact (agglomeration) in the dry film. It is postulated that a properly formulated conductive coating of this invention is one in which a majority of primary pigment and/or filler particles are pre-wetted or have adsorbed on their surface some solvent and/or a thin layer of some of the solvated polymeric binder, which maximize the free volume. This adsorbed layer of solvent and/or solvated binder forms a steric or entropic layer which prevents pigment-pigment contact thereby providing the required resistivity and at the same time improving the dispersion of pigment. The improved dispersion translates to an increased in the free volume of the system, and consequently lowers the liquid paint viscosity. The adsorbed layer (entropic stabilization) inhibits re-agglomeration when an electrostatic field is applied. During film formation the ultimate loss of the higher boiling solvents favors re-establishment of pigment-pigment contacts (agglomeration) and renders the free volume near or at zero, which re-establishes the conductivity of the dry paint film.

Selection of suitable solvents for high solids conductive coatings, which can wet and disperse the conductive pigment, can be made by any of several methods known to those skilled in the art. Thus in the case of higher solids, adhesion promoting, conductive primers mentioned earlier, in which the non-conducive binder is CPO and the like, it is known that aromatic solvents, which are derived from petroleum distillates, e.g. like Aromatic 100, Aromatic 150 and Aromatic 200 from the Exxon Company, are economical solvents for CPO. However, these solvents when used as the major component of a solvent formulation interfere with the resistive stability of the liquid paint. The exact cause of resistive failure is not known, but it is believed the certain components and impurities contained in these petroleum fractions may cause agglomeration or interfere with the deagglomeration of the conductive carbon pigments. Evidence for this assessment is confirmed by the higher viscosities observed for liquid paints which have been made from these aromatic petroleum fractions.

Although, it is to be expected that certain other highly aromatic compounds, which are excellent solvents for the non-conductive binder CPO, would behave as do the fractionated petroleum aromatic solvents. Surprisingly, it has been found that certain aromatic hydrocarbon compounds, when used as solvents not only have the property of dissolving the non-conductive binder CPO, but have the unique property of providing resistive stability when the liquid paint containing conductive pigments is subjected to an electrostatic field. It is thought that the aromatic character of these unique solvents is responsible for the solubility of the non-conductive binder CPO, but it is the structure of the solvent molecules which leads to the resistive stability of paints containing conductive pigments.

The electrical resistivity of liquid paints and solvents can be determined using standard test methods as described in ASTM D 5682-95. The resistivity or specific resistance is defined as the ratio of the d-c potential gradient in volts per centimeter paralleling the current flow within the test specimen to the current density in amperes per square centimeter at a given instant of time and under prescribed conditions. Resistivity is expressed in units of megohm-centimeters. Equipment developed by ITW Ransburg Electrostatic Systems, Byk-Gardner, Inc., and Graco conveniently measure the liquid paint resistivity. Typically a probe is immersed into a well agitated paint specimen and a measuring button is pressed for ten seconds, after which a reading is taken.

We have found that a more accurate assessment of the resistive stability of paints during electrostatic spray is made by measuring the resistivity of the unagitated paint. This duplicates conditions of low flow rates during a painting operation or no flow when the applicators are turned off. We have found that high solids paints that drift from a high resistivity (200 megohms-cms or greater) to a very low resistivity of less than about 5 megohms-cms in less than about 5 minutes during the test procedure, can short out the charging circuits of electrostatic application devices. It is theorized that resistive failure in these formulations may be caused by two phenomena:

(i) the conductive pigment tends to orient upon the application of an electrostatic field and form a conductive pathway within the liquid paint, in a sense a "live wire or shunt" is formed, and (ii) the conductive pigment is not uniformly dispersed and as such there are present agglomerates of the conductive pigment which degrades the packing character of the conductive pigment in the liquid medium.

Typically solvents used in low solids adhesion promoting conductive primers are mixtures and blends of toluene, xylenes (a commercial grade of ortho-, meta-, and para-xylene), and complex fractions of hydrocarbons known as Aromatic 100 and Aromatic 150. These materials either evaporate too quickly (toluene) or they contain structures in their compositions which interfere with their dispersive power towards the conductive pigment. As a result, coating formulations prepared from these commonly used solvents do not have adequate resistive stability and generally have higher viscosities which limits their solids contents.

Examples of suitable solvents for use in the present invention for the application of higher solids conductive adhesion promoting primers are aromatic hydrocarbons with monoalkyl substitution, dialkyl substitution where the alkyl groups are not ortho to each other, and trialkyl substitution where the alkyl groups are not in the 1,3, and 5 position of the benzene ring. Also included among suitable aromatic hydrocarbon solvents of the present invention are aromatics having substituent groups, such as halogenated aromatics, and the like. Examples of suitable aromatic hydrocarbon solvents are ethylbenzene, m-xylene, p-xylene, 1,2,4-trimethylbenzene, diethylbenzenes, isobutylbenzene, p-cymene, p-tert-butylbenzene, chlorotrifluoro toluene, chlorotoluene, chlorobenzene, n-propylbenzene, isopropylbenzene, n-butylbenzene, sec-butylbenzene, n-pentylbenzene, ispentylbenzene, p-tert-butyltoluene, and the like.

The concentration of the aromatic hydrocarbons of the present invention in the solvent component of the coating formulation will vary depending on the application, so long as the resistivity of the formulation is stable when a voltage is applied to the unstirred formulation for no more than about five minutes such that the resistivity is no less than about 5 megohms-cms. In some cases, the solvents of this invention may be used in low concentrations as additives to stabilize the resistivity of the paint. The balance of the solvents in the solvent component can be chosen from a wide variety of coating solvents known in the art, as long as they are capable of dissolving the polymeric component present in the primer composition, and which do not adversely affect the adhesion of the composition to the substrate. For example, toluene, xylenes, Aromatic 100, and Aromatic 150 can be used within limitations in conjunction with the aromatic hydrocarbon solvent component of the present invention. Polar organic solvents such as methyl amyl ketone, methyl ethyl ketone, diacetone alcohol, isophorone, and the like can also be used in conjunction with the aromatic hydrocarbon component in the coating compositions of the present invention to reduce the resistivity of the formulation, if desired, when it is to be applied by an electrostatic spraying technique.

In the preferred embodiment of this invention, the solvent and/or mixture of solvents (i) each have RER's in the range of 0.50 to 95, more preferably have RER's in the range of 1 to 85, and most preferably have RER's in the range of 4 to 75, (ii) allow an atomizable composition having a solids content (by weight) greater than 20%, more preferably a solids content greater than 25%, and most preferably a solids content greater than 30%, and (iii) give resistive stability of no less than about 5 megohms-cms to paint formulations containing conductive pigments when a voltage is applied to the unstirred paint for no more than about five minutes.

The coating compositions of the present invention may be applied to a wide variety of substrates, such as plastics and metals, by any of the methods used to apply conventional coatings, such as by spray coating, brush coating, roll coating, dip coating, flow coating, and the like, which are known to those skilled in the art.

The coating formulations of the present invention are particularly suitable when applied to substrates by spray methods. Suitable spray methods include air spray methods, high-volume low-pressure (HVLP) spray methods, airless spray methods, air-assisted airless spray methods, rotary atomizers, electrostatic spray methods, and the like, which are known to those skilled in the art.

Coating formulations applied by conventional spray methods typically contain a relatively high proportion of fast evaporating solvents (RER's greater than about 100) which provide the coating composition with a low spray viscosity which is required for proper atomization. The fast evaporating solvents are designed to evaporate in the spray so that the coating is deposited at a much higher viscosity to avoid runs and sags of the coating on the substrate. A relatively low proportion of slow and medium evaporating solvents (ER's within the range of about 0.01 to 100), which evaporate much less in the spray, also are used to provide proper flow characteristics for droplet coalescence and film formation on the substrate. By using the coating compositions and methods of application of the present invention, the required low atomization viscosity can be obtained by using reduced amounts of the solvent which results in reduced organic solvent emissions (VOC's) during the spraying application.

Air sprays, high volume low pressure (HVLP) sprays, and air-assisted airless sprays typically use coating compositions with a viscosity (at a temperature of about 25° C.) that is in the range of from about 30 centipoise to about 150 centipoise, preferably from about 50 to about 100 centipoise, in order to achieve the fine atomization that is required to obtain high quality coatings.

Airless sprays typically use a wider range of coating composition viscosities, with the viscosity used depending upon the quality requirement of the coating application to a substrate. Generally, airless sprays give poorer atomization and a poorer fan pattern than the air spray methods. Airless sprays typically use coating compositions with a viscosity (at a temperature of about 25° C.) that is below about 500 centipoise, preferably below about 300 centipoise, more preferably below about 150 centipoise, and most preferably below about 100 centipoise.

A preferred method for airless spraying of the coating compositions of the present invention is to heat the formulations to obtain a viscosity suitable for spraying. Heating the coating composition reduces the viscosity and reduces the overall concentration of the solvent component in the composition required for spraying. Higher temperatures give lower composition formulation viscosities. The maximum temperature to which the primer may be heated for spraying is generally determined by the thermal stability of the components in the primer composition. The heated spray temperature should generally be above 30° C., preferably above 40° C., and most preferably above about 45° C.

Heated airless sprays can use coating compositions that have a higher viscosity than those compositions used with no heating. The viscosity of the heated primer composition is preferably reduced to below about 200 centipoise, more preferably to below about 150 centipoise, and most preferably to below about 100 centipoise.

Airless sprays are formed by passing the coating composition under pressure through an orifice to form a spray. A high pressure drop across the orifice is used to propel the composition through the orifice at high velocity. A high velocity liquid emerges from the orifice that becomes unstable from shear with the surrounding air and the liquid breaks up into droplets. High viscosity coating compositions typically give poorer atomization for a given spray pressure, so usually a higher spray pressure must be used. Spray pressures typically range from about 300 to about 5000 pounds per square inch (psi), preferably from about 500 to about 4000 psi, and more preferably from about 700 to about 3000 psi. The orifice sizes of the spraying device generally range from about 0.004-inch to about 0.072-inch equivalent diameter. The orifice size is selected to give the desired application rate and proper atomization of the coating formulation. Turbulence promoters, such as pre-orifices may also be used to aid atomization of the coating composition.

A particularly preferred airless spray process for applying a coating composition directly to a substrate with reduced emission of volatile organic compounds is achieved by utilizing a compressed fluid that is a gas at standard conditions of 0° C. and one atmosphere absolute pressure (STP) as a viscosity reducing diluent for the composition in place of a portion of the solvent component. The coating compositions of the present invention which already contain a lower organic solvent content than conventional formulations and which have a higher viscosity, can be sprayed onto a substrate using even lower concentrations of the solvent component without increasing the viscosity of the coating composition by using a compressed fluid during the spraying operation. Accordingly, solvent emissions of VOC's using the compositions of the present invention can be reduced to even lower levels than previously possible by replacing substantial amounts of the organic solvent component with a compressed fluid. The solvent content of the coating formulations of the present invention can be lowered so that a composition sprayed with a compressed fluid typically has a viscosity (at a temperature of about 25° C.) of about 500 to about 5000 centipoise, preferably from about 700 to about 3000 centipoise, and more preferably from about 800 to about 2500 centipoise, although compositions with higher and lower viscosities may also be used.

The compositions of the present invention may be combined with at least one compressed fluid in a closed system in at least an amount, which when added to the composition is sufficient to render the viscosity of the liquid mixture of the coating formulation suitable for spraying. Preferably, the viscosity of the coating composition is less than about 200 centipoise, more preferably less than about 100 centipoise, and most preferably less than about 50 centipoise. The coating composition passes under pressure through an orifice forming a spray which is deposited directly onto the substrate surface to form a coating thereon.

As used herein, a "compressed fluid" is a fluid which may be in its gaseous state, a liquid state, or a combination thereof, or is a supercritical fluid, depending upon (i) the particular temperature and pressure to which it is subjected, (ii) the vapor pressure of the compressed fluid at that particular temperature, and (iii) the critical temperature and critical pressure of the fluid, but which is in its gaseous state at standard conditions of 0° C. temperature and one atmosphere absolute pressure (STP). As used herein, a "supercritical fluid" is a fluid that is at a temperature and pressure such that it is at, above, or slightly below its critical point.

Components which may be used as compressed fluids in the present invention, include, but are not limited to carbon dioxide, nitrous oxide, xenon, ethane, ethylene, propane, propylene, and mixtures thereof. Preferably, the compressed fluid has appreciable solubility in the polymeric component of the coating composition, is inert, and is environmentally compatible. Preferred compressed fluids are carbon dioxide and ethane. Carbon dioxide is the most preferred compressed fluid. The compressed fluid when used in the coating formulations of the present invention generally may be present in an amount of at least about 10 percent, preferably greater than about 15 percent, more preferably greater than about 20 percent, and most preferably greater than about 25 percent, based on the total weight of the coating composition (solvent, compressed fluid, and polymer components), in order to give sufficient viscosity reduction to the coating formulation. The compressed fluid in the coating formulation is generally used in an amount less than about 50 percent, preferably less than about 40 percent, based on the total weight of the coating composition. The compressed fluid is preferably used in an amount that is below its solubility limit in the coating composition at the spray temperature and pressure used. This avoids the formation of a compressed fluid rich phase that can extract a significant portion of the solvent component from the polymer rich phase, and thereby increase spray viscosity which can give poor atomization and high deposition viscosity which can result in poor film formation.

Methods and apparatus for spraying coatings by using compressed fluids at temperatures and pressures at which the compressed fluid is a supercritical fluid are described in the following U.S. Pat. Nos. 4,923,720 to Lee, et al.; No. 5,009,367 to Nielsen; No. 5,057,342, No. 5,106,650; and No. 5,108,799 to Hoy, et al.; and No. 5,171,613 to Bok, et al., the disclosures of which are hereby incorporated herein by reference. As disclosed in these patents, compressed fluids, such as carbon dioxide are not only effective viscosity reducers, they can produce a new airless spray atomization mechanism which is called a decompressive spray.

Decompressive sprays can have finer droplet size than conventional airless sprays and a feathered spray pattern needed to apply high quality coatings to substrates. The decompressive spray is formed by rapid expansion of the compressed fluid in a gaseous state as it is released from the solution in the liquid mixture of the coating composition during depressurization in the spray orifice. Decompressive sprays typically have a rounded, parabolic-shaped spray fan instead of the sharp, angular fans typical of conventional airless sprays. The spray also typically has a much wider fan width than conventional airless sprays produced by the same spray tip. Furthermore, no liquid film is visible as the spray emerges from the spray tip. As used herein, the phrase "decompressive spray" is understood to mean a spray, spray fan, or spray pattern that has the preceding characteristics. Preferably, the amount of compressed fluid used in the liquid spray mixture is sufficiently high to produce a decompressive spray of the coating composition formulations of the present invention.

The liquid mixture of the coating composition and compressed fluid may be prepared for spraying using any of the spray apparatus disclosed in the aforementioned patents, or using other apparatus.

While preferred forms of the present invention have been described, it should be apparent to those skilled in the art that coating composition formulations, methods, and processes may be employed that may be different from those specifically disclosed without departing from the spirit and scope of the presently claimed invention.

The following examples further illustrate the present invention. The examples are intended to be illustrative in nature and are not to be construed as limiting the scope of the invention.

EXAMPLE 1

To a half-gallon can is added 575.0 grams of toluene solvent and 12.7 grams of an epoxy resin which serves as a stabilizer. The material is mixed using a mechanical stirrer under medium agitation. To this stirred solution is added 118.9 grams of a chlorinated polypropylene resin, and the agitation speed is increased to high. After all the resin is dissolved, 146.8 grams of a long-oil alkyd resin in 90.8 grams of xylenes is added to the can, followed by 38.4 grams of titanium dioxide pigment, 9.2 grams of carbon black pigment, and 8.1 grams of a flatting agent. Agitation at high speed is continued for 10 minutes to blend all the ingredients. When blended, 50 grams of a small media is added to the can. A lid is secured on the can with clips and the can is shaken in a mechanical shaker for seven minute intervals until the target grind is obtained (6.0 Hegman based on ASTM D 1210-96). The can is opened between the seven minute intervals to vent pressure. The entire process usually takes about 25–30 minutes. The paint is then passed through a cone filter to filter out the small media. The theoretical solids of the paint is 33.4 weight percent. Viscosity is measured at room temperature (23° C.) using a Brookfield digital viscometer Model DV-II) at a speed of 30 rpm and with spindle 2. Resistivity measurements are taken with a Graco meter (Model 722886, 30 volts) by inserting the instrument's probe into the unagitated paint and taking a reading five minutes after the measuring button on the meter is depressed.

EXAMPLES 2–15

Paint is prepared using the procedure in example 1, except that the toluene solvent is replaced with the test solvent as shown in Table 2. The paints of examples 2, 4, 5, 9–13 are illustrative of the invention. The paints of examples 3, 6, 7, 8, 14, and 15 have unsuitable resistive stabilities.

TABLE 2

| Example # | Test Solvent[1] | RER | Boiling Point (° C.) | Brookfield Viscosity (cps) | Resistivity Measurement at 5 Min. (megohms - cms) |
|---|---|---|---|---|---|
| 1 | Toluene | 224 | 111 | 305 | 31 |
| 2 | Ethylbenzene | 80 | 136 | 985 | 2000 |
| 3 | Xylenes | 66 | 137–144 | 795 | <1 |
| 4 | p-Xylene | 74 | 138 | 474 | 2000 |
| 5 | m-XYlene | 70 | 139 | 312 | 2000 |
| 6 | o-Xylene | 56 | 144 | 621 | 1 |
| 7 | Aromatic 100 | 24 | 160–171 | 2270 | <1 |
| 8 | 1,3,5-Trimethylbenzene | 22 | 163 | 1850 | 2 |
| 9 | 1,2,4-Trimethylbenzene | 19 | 168 | 940 | 2000 |
| 10 | Isobutylbenzene | 18 | 174 | 935 | 2000 |
| 11 | p-Cymene | 15 | 177 | 638 | 2000 |
| 12 | Diethylbenzenes | 10 | 180–182 | 1790 | 2000 |
| 13 | p-tert-Butyltoluene | 6 | 190 | 960 | 2000 |
| 14 | Aromatic 150 | 4 | 184–205 | 3980 | <1 |
| 15 | Aromatic 200 | 0.01 | 231–277 | 6560 | <1 |

[1]. Test solvent is 86.4 weight percent of the total solvent composition. The remainder of solvent (13.6 weight percent) is xylenes.

EXAMPLES 16–17

The paint formulations of examples 13 and 14 were reduced to 28.0 weight percent solids with methyl ethyl ketone and sprayed with an air gun (55 psi air) onto TPO panels. Both gave excellent adhesion as measured by a crosshatch adhesion test (ASTM D 3359-95a), but the formulation of example 13 gave a smoother (less orange peel) dry film appearance than the formulation of example 14.

EXAMPLE 18

To a half-gallon can is added 411.15 grams of toluene solvent and 9.1 grams of an epoxy resin which serves as a stabilizer. The material is mixed using a mechanical stirrer under medium agitation. To this stirred solution is added 85.0 grams of a chlorinated polypropylene resin, and the agitation speed is increased to high. After all the resin is dissolved, 105.0 grams of a long-oil alkyd resin in 64.9 grams of xylenes is added to the can, followed by 29.1 grams of carbon black pigment, and 0.81 grams of a flatting agent. Agitation at high speed is continued for 10 minutes to blend all the ingredients. When blended, 50 grams of a small media is added to the can. A lid is secured on the can with clips and the can is shaken in a mechanical shaker for seven minute intervals until the target grind is obtained (6.0 Hegman based on ASTM D 1210-96). The can is opened between the seven minute intervals to vent pressure. The entire process usually takes about 25–30 minutes. The paint is then passed through a cone filter to filter out the small media. The theoretical solids of the paint is 32.5 weight percent. Viscosity and resistivity measurements were taken as in example 1.

EXAMPLES 19–29

Paint is prepared using the procedure in example 18, except the toluene solvent is replaced with the test solvent as shown in Table 3. The paints of examples 19, 26–28 are illustrative of the invention.

TABLE 3

| Example # | Test Solvent[1] | Brookfield Viscosity (cps) | Resistivity After 5 Min. (megohms - cms) |
|---|---|---|---|
| 18 | Toluene | 2000 | 2000 |
| 19 | Ethylbenzene | 950 | 2000 |
| 20 | Xylenes | 3200 | 2 |
| 21 | p-Xylene | 3050 | 2 |
| 22 | m-Xylene | 3550 | 2 |
| 23 | o-Xylene | 3850 | 2 |
| 24 | Aromatic 100 | 4750 | 2 |
| 25 | 1,3,5-Trimethylbenzene | 3950 | 2 |
| 26 | Isobutylbenzene | 1000 | 2000 |
| 27 | p-Cymene | 1050 | 2000 |
| 28 | p-tert-Butyltoluene | 650 | 2000 |
| 29 | Aromatic 150 | 6350 | 2 |

[1]. Test solvent is 86.4 weight percent of the total solvent composition. The remainder of solvent (13.6 weight percent) is xylenes.

EXAMPLE 30

The formulation of example 28 (resistivity at 5 minutes, 2000 megohms-cms) is added to the formulation of example 21 (resistivity at 5 minutes, 2 megohms-cms), until the new formulation consists of 85.5 parts, by volume, of the formulation of example 21 and 14.5 parts, by volume, of the formulation of example 28. The resistivity of the new formulation at 5 minutes was 2000 megohms-cms. This example is illustrative of how the solvents of this invention can be used as low level additives to stabilize the resistivity of an unstable formulation.

What is claimed is:

1. A composition of matter comprising a non-conductive polymeric component, a conductive pigment, a solvent component, and optionally, at least one additive component, said composition being capable of being applied to a substrate and forming a coating on said substrate, wherein:

(a) said polymeric component is capable of forming a solution with said solvent component and;

(b) said solvent component comprising at least one aromatic hydrocarbon component which gives resistive stability when a voltage is applied to the unstirred composition for no more than about five minutes such that the resistivity of the composition is no less than about 5 megaohms-cms and has an RER in the range of 0.5 to 95 and;

(c) said composition has a total weight solids content greater than 20 weight percent.

2. The composition of claim 1 wherein the polymeric component is selected from the group consisting of a thermoplastic polyolefinic, chlorinated polyolefinic (CPO), chlorinated maleic anhydride-propylene copolymers, silylated CPO block copolymers, maleic acid or anhydride grafted styrene-butadiene copolymers, polymers of vinyl esters, vinyl chloride and copolymers thereof, acrylic esters and copolymers there of, styrene and styrene copolymers, butadiene, isoprene, and other olefinic polymers such as polymers from propylene and its copolymers with ethylene, and other alpha olefins, and the like.

3. The composition of claim 2 wherein the polymeric component is a chlorinated polypropylene.

4. The composition of claim 1 wherein the conductive pigment is selected from the group consisting of carbon blacks, powdered graphite, powdered or flake metals such as zinc, iron, copper, brass, bronze, stainless steel, nickel, silver, gold, aluminum, and the like.

5. The composition of claim 1 wherein the additive component is a member selected from the group consisting of non-conductive pigments, dispersing aids, modifying polymers, plasticizers, sanding aids, flatting agents, water scavengers, stabilizers, and mixtures thereof.

6. The composition of claim 5 wherein the non-conductive pigment is titanium dioxide.

7. The composition of claim 1 wherein the total solids content of the composition is greater than 25 weight percent.

8. The composition of claim 1 wherein the total solids content of the composition is greater than 30 weight percent.

9. The composition of claim 1 wherein the aromatic hydrocarbon solvent component(s) have RER's in the range of 1.0 to 85.

10. The composition of claim 1 wherein the aromatic hydrocarbon solvent component(s) have RER's in the range of 4.0 to 75.

11. The composition of claim 1 having a viscosity at 25° C. below about 5000 centipoise.

12. The composition of claim 1 having a viscosity at 25° C. below about 1000 centipoise.

13. The composition of claim 1 having a viscosity at 25° C. below about 200 centipoise.

14. The composition of claim 1 having a viscosity at 25° C. below about 50 centipoise.

15. The composition of claim 1 applied to a thermoplastic substrate surface.

16. The composition of claim 1 applied to a polyolefinic substrate surface.

17. The composition of claim 1 applied to a substrate by a spraying method technique selected from the group consisting of air spraying, high volume low pressure spraying, air-assisted airless spraying, airless spraying, rotary atomizing spraying and electrostatic spraying.

18. The composition of claim 1 applied to a substrate using an airless spraying technique.

19. The composition of claim 1 applied to a substrate with an airless spraying technique utilizing a compressed fluid.

20. The spraying technique of claim 19 wherein the compressed fluid is carbon dioxide.

21. The spraying technique of claim 20 wherein the compressed fluid replaces up to about 30 percent of the aromatic hydrocarbon solvent component.

22. The composition of claim 1 applied to a substrate using an electrostatic spraying technique.

23. The composition of claim 1 applied to a substrate using a rotary bell or mini-bell applicator.

24. An article of manufacture comprising a substrate having a coating directly adhering to the substrate's surface comprising a polymeric component, and, optionally at least one additive component, wherein said coating is applied to the substrate using the composition of claim 1.

* * * * *

UNITED STATES PATENT AND TRADEMARK OFFICE

CERTIFICATE OF CORRECTION

PATENT NO. : 6,106,742
DATED : August 22, 2000
INVENTOR(S) : J.N. Argyropoulos; R.H. Bailer; K.L. Hoy; G.R. Gilliam; K.J. Riggs It is certified that error appears in the above-identified patent and that said Letters Patent is hereby corrected as shown below:

Title page,
Item [54], should read: HIGH SOLIDS CONDUCTIVE COATING COMPOSITIONS SUITABLE FOR ELECTROSTATIC ATOMIZATION APPLICATION METHODS Claim 1
Should read:

1 A composition of matter comprising a non-conductive polymeric component, a conductive pigment, a solvent component, and optionally, at least one additive component, said composition being capable of being applied to a substrate and forming a coating on said substrate, wherein:

(a) said polymeric component is capable of forming a solution with said solvent component and;

(b) said solvent component comprising at least one aromatic hydrocarbon component selected from the group consisting of ethylbenzene, m-xylene, p-xylene, n-propylbenzene, isopropylbenzene, n-butylbenzene, isobutylbenzene, sec-butylbenzene, tert-butylbenzene, n-pentylbenzene, isopentylbenzene, p-tert-butyltoluene, 1,2,4-trimethylbenzene, diethylbenzenes, p-cymene, chlorotrifluorotoluene, chlorotoluene, chlorobenzene, and mixtures thereof, and which solvent gives resistive stability when a voltage is applied to the unstirred composition for no more than about five minutes such that the resistivity of the composition is no less than about 5 megaohms-cms and has an RER in the range of 0.5 to 95 and;

UNITED STATES PATENT AND TRADEMARK OFFICE

CERTIFICATE OF CORRECTION

PATENT NO. : 6,106,742
DATED : August 22, 2000
INVENTOR(S) : J.N.Argyropoulos; R.H. Bailer; K.L. Hoy; G.R. Gilliam; K.J. Riggs It is certified that error appears in the above-identified patent and that said Letters Patent is hereby corrected as shown below:

(c) said composition has a total weight solids content greater than 20 weight percent.

Signed and Sealed this

Seventh Day of August, 2001

Attest:

Nicholas P. Godici

NICHOLAS P. GODICI

*Attesting Officer*

*Acting Director of the United States Patent and Trademark Office*